US006585274B2

(12) United States Patent
Sawyer

(10) Patent No.: US 6,585,274 B2
(45) Date of Patent: Jul. 1, 2003

(54) PORTABLE LUGGAGE CARRIER

(75) Inventor: Kenneth I. Sawyer, Stamford, CT (US)

(73) Assignee: Pharmaceuticals Resources, Inc., Woodcliff Lake, NJ (US)

( * ) Notice: Subject to any disclaimer, the term of this patent is extended or adjusted under 35 U.S.C. 154(b) by 0 days.

(21) Appl. No.: 09/883,664

(22) Filed: Jun. 18, 2001

(65) Prior Publication Data

US 2002/0017767 A1 Feb. 14, 2002

Related U.S. Application Data

(60) Provisional application No. 60/214,685, filed on Jun. 27, 2000.

(51) Int. Cl.[7] .................................................. B62B 1/00

(52) U.S. Cl. ...................... 280/37; 280/47.18; 280/654; 482/72

(58) Field of Search ................................ 280/37, 47.25, 280/47.18, 47.24, 654, 655, 659; 482/72, 73

(56) References Cited

U.S. PATENT DOCUMENTS 3,586,322 A * 6/1971 Kverneland .................. 482/38
3,612,563 A * 10/1971 Kazmark, Sr. ........... 280/47.24
3,947,054 A * 3/1976 Hall ........................ 280/47.29
3,998,476 A * 12/1976 Kazmark, Sr. ............. 16/113.1
4,072,319 A * 2/1978 Berger ..................... 280/47.24
4,290,625 A * 9/1981 Barriere ................... 280/47.19
4,373,716 A * 2/1983 Pagani ........................ 482/28
4,730,826 A * 3/1988 Sudmeier .................... 482/112
5,007,632 A * 4/1991 Wilkinson .................. 482/130
5,074,550 A * 12/1991 Sloan ......................... 482/112
5,213,360 A * 5/1993 Lin ............................. 280/30
5,230,674 A * 7/1993 Terauds ...................... 482/148
5,230,676 A * 7/1993 Terauds ...................... 482/53
5,306,027 A * 4/1994 Cheng ......................... 280/30
5,669,659 A * 9/1997 Dittmer ....................... 280/30
5,860,897 A * 1/1999 Gilbert et al. .............. 482/123
6,186,929 B1 * 2/2001 Endelman et al. .......... 482/101

FOREIGN PATENT DOCUMENTS

FR 002722667 A3 * 1/1996 ......... A45C/013/38
JP 407308219 A * 11/1985 ......... A45C/013/38

* cited by examiner

*Primary Examiner*—Brian L Johnson
*Assistant Examiner*—Kelly E Campbell
(74) *Attorney, Agent, or Firm*—Frommer Lawrence & Haug LLP

(57) ABSTRACT

A portable luggage carrier, and, more particularly, to such a carrier having an exercise means associated therewith. The portable carrier comprises a support member or means for supporting the luggage. A fold out platform means connected to the support means for holding the luggage is provided and the carrier has a collapsible wheel means affixed to the support means in association with a handle means affixed to the support member.

2 Claims, 1 Drawing Sheet

PORTABLE LUGGAGE CARRIER

This applications claims priority from U.S. provisional application Serial No. 60/214,685 filed Jun. 27, 2000, which is incorporated herein by reference.

BACKGROUND OF THE INVENTION

1. Field of the Invention

This invention relates to a portable luggage carrier, and more particularly, to a carrier comprising an exercise means attached to and in cooperation with the carrier. The carrier comprises, in addition to the exercise means, a support member having pivotably attached thereto a fold out luggage supporting member having collapsible wheel means attached to the luggage supporting member by means of a telescoping handle means affixed to the support.

2. Brief Description of the Prior Art

This invention relates to a portable luggage carrier, such as for example a carrier for such loads as suitcases, golf bags, etc. Such carriers have been provided in the past but heretofore there has not been such a carrier which contains or is associated with an exercise means to provide a source of exercise when the carrier is not supporting luggage.

SUMMARY OF THE INVENTION

This invention relates to a portable luggage carrier, and more particularly to such a carrier having an exercise means associated or incorporated therewith. The carrier comprises a support member for supporting the luggage, a fold out platform means connected to the support member for holding the luggage having a collapsible wheel means affixed to the support means in association with a handle means affixed to the support member, and an exercise means attached to the support means.

DETAILED DESCRIPTION OF THE INVENTION

Figure 1:
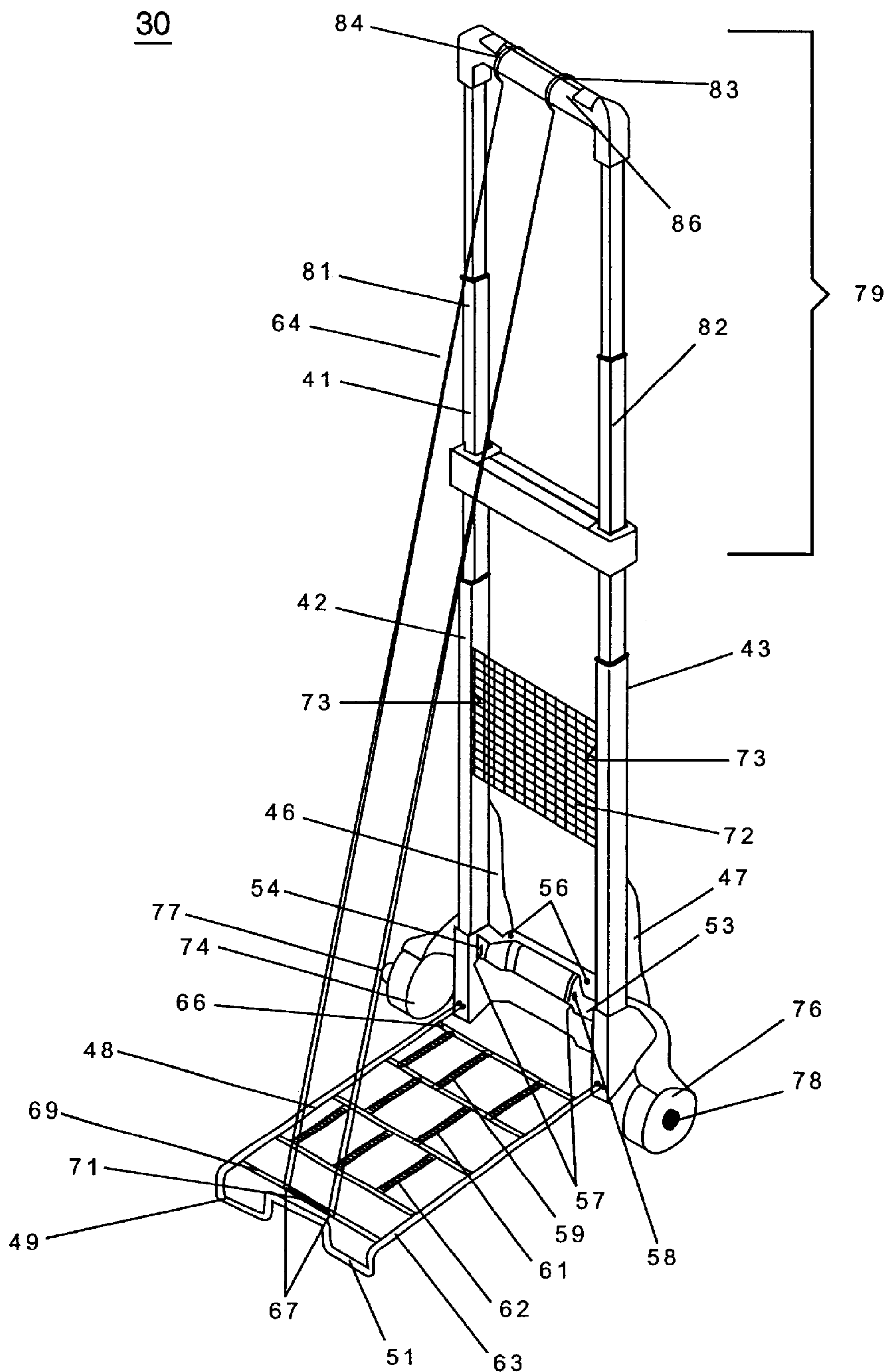
FIG. 1 is a perspective view of a portable luggage carrier of the invention.

Referring to FIG. 1 a luggage carrier 30 is shown according to the invention. As used herein the term "luggage" is not meant to be limited to a case for carrying clothes, but is meant to include all types of suitcases, boxes, golf bags, athletic bags and the like. The carrier 30 is utilized or destined for carrying luggage (not shown), e.g. a suitcase, a golf bag, boxes, etc.

The collapsible carrier 30 has a support member or frame 41 having a first leg 42 and a second leg 43 and adjoining cross arm 44 affixed to legs 42 and 43. Affixed to the cross arm 44 is a pair of triangular braces 46 and 47 for supporting the cross arm 44 and legs 42 and 43.

A fold out platform device 48 is pivotably attached to the support member 41 for holding the luggage (not shown) when not in use for exercising. The platform means 48 has support legs 49 and 51 conventionally attached thereto, e.g. welded, bolted, or integrally formed as part of platform means 48, at each front corner thereof for supporting the carrier 30 when it is loaded with the luggage it is intended to carry. The support legs 49, 51 may be fabricated from the same material as the platform 48, which may be plastic or a metal, or may differ from platform 48 and attached to platform 48 by any conventional means, e.g. by bolting, welding, etc.

Platform means 48 is pivotably attached to the frame 41 by any conventional means. For illustrative purposes only, such pivotable attachment can be carried out as illustrated in U.S. Pat. No. 4,248,453, incorporated hereinto by reference in its entirety. In particular as illustrated in FIG. 1, the fold out platform device 48 is provided with a pair of hinge members 53 and 54 integrally formed therein, which are capable of being rotated about the cross arm 44 when it is desired that platform means 48 is to remain in an extended position perpendicular to the cross arm 44. The arm 44 is internally threaded with a plurality of threaded openings 56 destined to receive a plurality of securing rods 57 destined to pass through mating holes 58 contained in the binges 53 and 54. One end of the rod 57 is matingly threaded for screwing into openings 56 to secure the platform means 48 so that it does not rotate if desired. The type of rotational and attachment means is not critical and as indicated any such means known in the art can be employed.

The platform means 48 has a plurality of tension springs which are interchangeable with one another. The tension springs are illustrated in FIG. 1 as spring 59, 61 and 62. The springs 59, 61 and 62 are releasably attached to the bottom 63 of the platform means 48 along its horizontal axis by any conventional suitable means known in the art, e.g. bolting, threaded security pins, etc. Typically, the tension springs are attached by means of bolting.

The tension springs 59, 61 and 62 are of different tensions and are interchangeable with one another, i.e. a higher tension spring 59 can be removed from the platform means 48 and interchanged with a removed lower tension spring 62 or a removed intermediate tension spring 61, as desired, to change the tension for the lifting and rotation of platform means 48 during the destined exercise operation, utilizing reversible shock cords, illustrated in FIG. 1 as having numeral 64.

The shock cords 64 are intended to provide various pulling exercises using the platform means 48 at a selected tension, e.g. high, medium, low, by adjusting the springs 59, 61, 62. In this regard, in operation, the spring closest to the rear end 66 of the platform means 48, when provided with the highest tension spring, illustrated as spring 59, will provide the highest level of exercise. The shock cords 64 have a loop 67 which is releasably connected to the front end 69 of the platform 48, utilizing any conventional means, e.g. a loop/link releasable attachment mechanism as illustrated in U.S. Pat. No. 4,373,716, which is incorporated by reference hereinto in its entirety.

Provided in the front end 69 of the platform means 48 is a crunch bar 71. The crunch bar 71 is destined to provide support for the exerciser's legs (not shown) when the carrier is used horizontally in an exercise mode. In this regard, also provided on the supporting frame 41 of the carrier 30 is a lockable rowing-type seat 72 of conventional design fabricated from metal, plastic, etc. The seat 72 is supported on the legs 42 and 43 and extends perpendicularly thereto and is slideable therealong when the carrier is 30 in a horizontal exercise mode. The seat 72 is slideable along legs 42 and 43 in any conventional manner. Typically a channel (not shown) is fabricated in each leg 42, 43 and an appendage, e.g. a rod, etc. (not shown) extends from, the sides 73 of the seat 72 into each channel (not shown) and traverses the length of each such channel a calculated, predetermined distance.

The seat 72 is affixed to each leg 42, 43 whereby it lies flat when the carrier 30 is in its carrying or supporting mode or when the carrier is in a vertical exercise mode. The seat 72, as previously indicated, can be rotated whereby it extends away from the legs 42, 43, typically at a right angle from legs 42 and 43 and is locked, by an conventional means, e.g. threaded rods, etc., in such a position thereby enabling a person who is exercising to sit on the seat 72 on the support 41, when it is in a vertical position. The rotation of the seat 72 can be accomplished by any conventional means, e.g. a hinge mechanism with locking bolts, etc.

Affixed to and connecting legs 42 and 43 is an axle (not shown) which rotatably supports a pair of wheels 74 and 76 for both rolling the carrier 30 when carrying a load (not shown) and increasing the stability of the carrier 30. The wheels 74, 76 are preferably made of plastic, however, any suitable material can be used, such as for example a metal, wood, rubber, etc. Once the wheels 74, 76 are put on the axle (not shown) end caps 77 and 78 are force fitted onto the axle (not shown) to keep the wheels 74, 76 thereon. Alternatively, any conventional retaining means can be employed.

A telescoping handle means 79 is affixed to the support or frame 41. The handle means 79 has telescoping sections 81 and 82 which pass into legs 42 and 43 and are releasably locked therein. The handle means 79 is not critical and can be of any conventional type. In this regard reference is made to U.S. Pat. Nos. 3,998,476 and 4,248,453, which describe such typical handle means which have telescoping tube assemblies which are moveable between extended and retracted positions. The disclosures of these two patents are incorporated by reference hereinto in their entirety.

As illustrated in FIG. 1, the shock cords 64 are attached to two loops 83 and 84, e.g. by means of hooks, which are removably attached to the top bar 86 of the handle means 79. The top bar 86 is removably affixed to the handle means 79 and when so removed, in the exercise mode, of the carrier 30, with cords 64 attached thereto are used to pull up and down the tensioned platform means 48, in a similar exercise fashion illustrated in U.S. Pat. No. 4,373,716, incorporated by reference hereinto in its entirety. Additionally, it is to be noted that the cords 64, can be extended over the bar 86 to the opposite side of the carrier 30 when the carrier 30 is used in an exercise mode.

It is again to be noted that the carrier 30 can be used in a horizontal plane i.e. lying down, and in a vertical plane, i.e. erect, as when carrying a load when not in the exercise mode.

In an alternative embodiment, a carry-on luggage bag suitable for storage in the overhead compartment of an airplane can be employed. Typically, these luggage bags have a wheel means and a telescoping handle means similar to that as previously described in FIG. 1 for carrier 30. Additionally the platform means 48, shock cords 64 and their attachment can be configured and fixed in the bottom of such luggage bag covered over by a masking film or base upon which the traveler's clothes, toiletries, etc. are placed when travelling. In an exercise mode the carry-on luggage with its counterpart platform means 48 and shock cords 64 can be employed as previously described.

I claim:

1. A portable luggage carrier comprising:

(a) a support means having two legs and an adjoining cross arm;

(b) a fold out spring tensioned platform means, comprising at least one tension spring attached thereto, pivotably connected to said support means for providing exercise and for holding luggage;

(c) a telescoping handle means affixed to said support means for moving the carrier;

(d) a wheel means affixed to said support means for moving the carrier;

(e) shock cords affixed to said tensioned platform means, to cooperate therewith, to provide either a horizontal or a vertical mode of exercise; and (f) a rowing seat slideable a predetermined distance along each of said two legs.

2. The carrier as defined in claim 1, wherein said tensioned platform comprises a plurality of tension springs having different tensions.

* * * * *